United States Patent

Renbaum et al.

[11] Patent Number: 6,031,136
[45] Date of Patent: Feb. 29, 2000

[54] PROCESS FOR PREPARING METHYLENE DIPHENYLAMINES BY PARTIAL NEUTRALIZATION OF ACIDIC METHYLENE DIPHENYLAMINES

[75] Inventors: Louis Renbaum, Richmond Hill, Ga.; Mark S. Solomon, Humble; William D. Tippins, League City, both of Tex.

[73] Assignee: Bayer Corporation, Pittsburgh, Pa.

[21] Appl. No.: 08/094,933

[22] Filed: Jul. 21, 1993

[51] Int. Cl.[7] .................................................. C08G 18/00
[52] U.S. Cl. ...................................... 564/333; 252/182.21
[58] Field of Search ........................ 564/333; 252/182.21

[56] References Cited

U.S. PATENT DOCUMENTS

| | | | |
|---|---|---|---|
| 4,259,526 | 3/1981 | Dunlap et al. | 564/331 |
| 4,294,987 | 10/1981 | Prather et al. | 564/333 |
| 4,465,639 | 8/1984 | Hatfield, Jr. | 260/453 PH |
| 4,792,624 | 12/1988 | Hatfield, Jr. et al. | 564/333 |
| 5,286,760 | 2/1994 | Bolton | 564/333 |

FOREIGN PATENT DOCUMENTS

| 1288937 | 9/1972 | United Kingdom | 564/333 |

*Primary Examiner*—Rachel Gorr
*Attorney, Agent, or Firm*—Joseph C. Gil; Lyndanne M. Whalen; Godfried R. Akorli

[57] ABSTRACT

Disclosed herein is a process for preparing a reaction product containing methylene diphenylamine, comprising reacting aniline and formaldehyde in the presence of an acid catalyst wherein the acid level of the resulting reaction mixture is reduced during digestion of the reaction mixture.

8 Claims, No Drawings

PROCESS FOR PREPARING METHYLENE DIPHENYLAMINES BY PARTIAL NEUTRALIZATION OF ACIDIC METHYLENE DIPHENYLAMINES

FIELD OF THE INVENTION

The present invention relates to the preparation of polyamines. More specifically, the invention relates to a process for preparing methylene diphenylamines by partial neutralization of acidic aniline/aldehyde reaction products.

BRIEF DESCRIPTION OF THE PRIOR ART

Generally, it is known in the art to react aniline with formaldehyde in the presence of an acid such as hydrochloric acid to produce methylene diphenylamines. Of particular interest here is the methylene diphenylamines which are useful in the production of polyisocyanates which in turn are useful in the preparation of polyurethane/polyurea foams. Lately, the color of foams has become one of the requirements for judging the quality of foams. Foams which are otherwise acceptable can be rejected because of dark color.

Poor quality of the methylene diphenylamines and consequently the polyisocyanates, at least in part, has been blamed for the discoloration in foams. Hence, a number of improvements in this area have been made in the preparation of higher quality methylene diphenylamines.

U.S. Pat. No. 4,792,624 discloses that polymethylene polyphenyl polyisocyanates of improved color can be obtained from certain polyamines which are prepared by the following process. The process comprises condensing aniline and formaldehyde in the presence of an acid catalyst and is characterized by adding a minor proportion of a polyamine mixture comprising di(aminophenyl)methanes and oligomeric polymethylene polyphenyl polyamines, (collectively known as polymeric MDA) to an intermediate stage of the condensation reaction where the various intermediately formed aminobenzoylamines are present.

U.S. Pat. No. 4,465,639 discloses the production of polymethylene polyphenyl polyamines by addition of controlled amounts of water to the reaction mixture produced by phosgenation of a mixture of polymethylene polyphenyl polyamines (and the like polyamines produced by condensation of formaldehyde and aromatic amines) prior to a complete removal of excess phosgene. The corresponding polymethylene polyphenyl polyisocyanate is said to have significantly improved properties such as color of the polyisocyanates.

U.S. Pat. No. 4,259,526 discloses a process for the preparation of mixtures of polyamines of the polyamino-polyaryl-polymethylene type whereby the proportion of the ortho-substituted products are substantially increased. This increase is brought about by adding the acid catalyst in two stages by reacting an aromatic amine with formaldehyde in the presence of an aqueous acid catalyst, or subjecting a condensate which has been obtained from an aromatic amine and formaldehyde in the absence of a catalyst to a first rearrangement in the presence of an aqueous acid catalyst, followed by adding aqueous acid catalyst to the resulting mixture, and then rearranging the intermediates by heating the mixture to 75 to 150 degrees centigrade. This mixture of polyamines is thereafter recovered.

By the present invention, there is provided another process for preparing polyamines which upon phosgenation produce polyisocyanates of light color.

SUMMARY OF THE INVENTION

The present invention encompasses a process for preparing a reaction product containing methylene diphenylamine, comprising reacting aniline and formaldehyde in the presence of an acid catalyst; reducing the acid level of the resulting reaction mixture during digestion of the reaction mixture, followed by completely neutralizing the reaction product after further digestion. Isocyanates corresponding to the polyamines and reaction products thereof, e.g., foams are also encompassed by the present invention.

In the present embodiment of the invention the process for preparing the reaction product containing methylene diphenylamine comprises reacting aniline with a formaldehyde in the presence of hydrochloric acid; partially neutralizing the reaction product with sodium hydroxide during the digestion stage of the reaction, followed by completely neutralizing the reaction product after the digestion.

U.S. Pat. No. 4,259,526 which discloses typical aniline and formaldehyde reactions in the presence of an acid is incorporated herein by reference subject to modifications in accordance with the present invention, as described more fully hereunder.

DETAILED DESCRIPTION OF THE INVENTION

In accordance with the invention, the reaction product containing methylene diphenylamines of the claimed invention is characterized by low levels of certain impurities. It is believed that increasing levels of these impurities darken the color of polyisocyanates derived from said amines. Generally, methylene diphenylamines can be prepared by reacting aniline with formaldehyde in the ratio of 1.6 to 8.0 and preferably 1.6 to 5.0, in the presence of an acid such as hydrochloric acid.

The amount and type of the acid useful herein is that which can effectively catalyze the subject reaction. The useful acids can be the art-known acids disclosed in the prior art cited above. Illustrative but non-limiting examples of the useful acids include water soluble acids having pKa values below 2.5 and preferably below 1.5. Specific examples include hydrochloric acid which is preferred, hydrobromic acid, sulfuric acid, triflouroacetic acid, methanesulfonic acid, phosphoric acid, formic acid, acetic acid, citric acid and the like. Typically, the acid level is about 10% to 100% and preferably 25% to 50% (molar) based on the aniline. The acid can be added separately or admixed with aniline in a reaction vessel which is usually referred to as "a mix reactor", at the "initial stage" of the reaction. As would be realized, the acid salt of the aniline can be reacted with the formaldehyde.

The process of this invention may entail split addition of the reagents. For example, the initial stage of the reaction may be performed in two stages in which portions of the formaldehyde are added in stages.

The reaction, at the initial/condensation stage takes place at a temperature of 0° C. to 100° C. and preferably 35° C. to 45° C., at atmospheric pressure and over a period of time sufficient to form intermediates of the reaction product (aminobenzylamines and the like). The period of time can be from about 5 seconds to 60 minutes and preferably 15 minutes to 45 minutes. The reaction can be conducted in one or more reaction vessels, and the progress of the reaction can be monitored by conventional analytical techniques.

At the end of the condensation stage, the reaction mixture is admitted to the digestion stage. By the term "digestion" is meant the stage at which the intermediate aminobenzylamines rearrange to form methylene diphenylamines and polymethylene polyphenylamine. It is a distinct feature of the invention that the process for preparing the methylene diphenylamine comprises the step of reducing the acid level of the reaction mixture during digestion. The acid level is reduced to a level sufficient to effect the rearrangement of the aminobenzylamine over the digestion temperature and residence time described hereunder. The reduction in acid level can be effected by partially neutralizing the reaction mixture to the desired acid level, during the digestion stage. In accordance with the invention, less than the stoichiometric amount of a base required to neutralize the acid is employed. This amount of the base can be from about 10% to 90% and preferably 70 to 80 molar percent based on the amount of acid catalyst employed. The useful base is that which can effectively neutralize the acids described hereinabove. The base can be an art-known one such as disclosed in the prior art cited above. The useful base can be selected from the group consisting of sodium hydroxide, potassium hydroxide and the like. Typically, the digestion stage is conducted at an elevated temperature of about 60° C. to 200° C. and preferably 90° C. to 160° C., at a pressure sufficient to control boiling of the reaction mixture, for a period of time (residence time) sufficient to effect the rearrangement of aminobenzylamines into methylene diphenylamines. Typically the residence time is from about 60 minutes to 400 minutes and preferably 100 minutes to 240 minutes. In a multi-vessel, continuous digestion process the partial neutralization is carried out continuously at a point in the process where the reaction mixture has been digested for from 10% to 90% and preferably from 40% to 60% of the total digestion time. After complete digestion, the remainder of the base is added to fully neutralize the acid.

In the practice of the invention, the reaction product containing methylene diphenylamine can be used in the preparation of lighter color isocyanate materials by the reaction of phosgene (phosgenation) with the reaction product containing methylene diphenylamine. The phosgenation reaction can be conducted in the presence of an inert solvent such as chlorobenzene. The polyamines are reacted with phosgene in molar ratios of 1.5 to 20 moles and preferably about 2.2 to 4.0 moles of phosgene per amine group. Upon completion of the phosgenation, the excess phosgene and hydrogen chloride formed are separately or simultaneously removed. The phosgenation product which is present after the removal of excess phosgene and HCl is in the form of a solution and may be separated into a gaseous phase containing volatile compounds having isocyanate groups and a liquid phase which is substantially crude polyisocyanate. The liquid phase can be worked up to produce polyisocyanates in a purer state.

In turn, the lighter color polyisocyanates can be used in the preparation of lighter color isocyanate reaction products such as foams. In the preparation of the foams, the polyisocyanates are reacted with an isocyanate reactive compound such as art-known polyols orpolyamines, in the presence of a blowing agent such as carbon dioxide derived from the reaction of the polyisocyanate and water. Art-known auxiliary agents and additives are usually employed in the preparation of the foams.

The invention is further illustrated but is not intended to be limited by the following examples in which all parts and percentages are by weight unless otherwise specified.

EXAMPLES

Comparative Example
The Process For Preparing Polyamines (Conventional Technique)

In a 2 liter, 4 neck round bottom flask equipped with a mechanical paddle stirrer, a reflux condenser, an addition funnel under an inert atmosphere is placed 745 g of aniline. The liquid is cooled using an ice bath to ~20° C., at which time 380 g of 36% HCl is added and the resulting mixture is stirred and cooled to ~10–20° C. Via the additional funnel is added 210 g of 37% formaldehyde while maintaining the temperature of the reaction mixture below 35° C. The reaction mixture is stirred at this temperature for an additional 15 minutes at which time 105 g of 37% formaldehyde is added via the addition funnel. The reaction mixture is then heated to a temperature of 60° C. and stirred for 30 minutes, at which time the temperature is raised to achieve reflux and maintained with reflux for 30 minutes. The reaction mixture is then cooled to 80° C. and 306 g of 50% sodium hydroxide is added. The resulting reaction mixture is heated to reflux and maintained for 15 minutes. The reaction mixture is cooled to 25° C. and poured into a large separatory funnel. The organic material of the mixture is separated from the aqueous brine and introduced back into the round bottom flask. To the flask is then added 750 ml of demineralized water and under an inert atmosphere the mixture is heated to reflux with stirring. The mixture is then cooled to 25° C. and poured into the separatory funnel. The organic layer is separated from the aqueous layer and then washed twice with demineralized water. The organic layer is then poured into a 2 liter round bottom flask equipped with a magnetic stirrer and a vacuum source. The organic material is heated to 180° C. at a pressure of 1–3 Torr and maintained at that temperature until the MDA vapors become visible in the condensor separating the flask from the vacuum source. The resulting material is approximately 1 kg of monomeric and polymeric methylene diphenyl diamine.

EXAMPLE OF THE PRESENT INVENTION

In a 2 liter, 4 neck round bottom flask equipped with a mechanical paddle stirrer, a reflux condenser, an additional funnel under an inert atmosphere is placed 745 g of aniline. The liquid is cooled using an ice bath to ~20° C., at which time 380 g of 36% HCl is added and the resulting mixture is stirred and cooled to ~10–20° C. Via the additional funnel is added 210 g of 37% formaldehyde while maintaining the temperature of the reaction mixture below 35° C. The reaction mixture is stirred at this temperature for an additional 15 minutes at which time 105 g of 37% formaldehyde is then heated to a temperature of 60° C. and stirred for 30 minutes at which time 230 g of 50% sodium hydroxide is added to the reaction mixture and the temperature is raised to achieve reflux and maintained with reflux for 30 minutes. The reaction mixture is then cooled to 80° C. and 76 g of 50% sodium hydroxide is added. The resulting reaction mixture is heated to reflux and maintained for 15 minutes. The reaction mixture is cooled to 25° C. and poured into a large separatory funnel. The organic material is separated from the aqueous brine and introduced back into the round bottom flask. To the flask is then added 750 ml of demineralized water under an inert atmosphere. The mixture is heated to reflux with stirring. The mixture is then cooled to 25° C. and poured into the separatory funnel. The organic layer is separated from the aqueous layer and then washed twice with demineralized water. The organic layer is then poured into a 2 liter round bottom flask equipped with a magnetic stirrer and a vacuum source. The organic material is heated to 180° C. at a pressure of 1–3 Torr and maintained at that temperature until MDA vapors become visible in the condensor separating the flask from the vacuum source. The resulting material is approximately 1 kg of monomeric and polymeric methylene diphenyl diamine.

Color Properties of Polymethylene Polyphenvl Polyisocyanates Prepared From Various Polyamines

| MDA Process | 430 nm | 520 nm |
|---|---|---|
| Comparative Process | 0.5 | 0.1 |
| Process of the invention | 0.4 | 0.08 |

The polyisocyanate derived from polyamines which were prepared by the process of this invention showed appreciable reduction in color intensity as measured by an ultraviolet visible spectrophotometer at 430 and 520 nanometers.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a reaction product containing methylene diphenylamine, comprising reacting aniline and formaldehyde in the presence of catalyst; reducing the acid level of the resulting reaction mixture during digestion of the reaction mixture, and followed by completely neutralizing the reaction product after digestion.

2. The process of claim 1 wherein the acid is hydrochloric acid.

3. The process of claim 1 wherein the acid level of the resulting reaction product is reduced by partial neutralization.

4. The process of claim 3 wherein the partial neutralization is conducted at a temperature of about 50° C. to 200° C.

5. The process of claim 3 wherein the neutralization is conducted with a base.

6. The process of claim 3 wherein the base is sodium hydroxide.

7. The process of claim 5 wherein the base is used for the partial neutralization comprises from 10% to 90% of the stoichiometric amount.

8. The process of claim 3 wherein the partial neutralization takes place after from 10% to 90% of the total digestion time.

* * * * *